United States Patent
Quiet et al.

(10) Patent No.: US 10,241,536 B2
(45) Date of Patent: Mar. 26, 2019

(54) METHOD, APPARATUS AND SYSTEM FOR DYNAMIC CLOCK FREQUENCY CONTROL ON A BUS

(71) Applicant: Intel Corporation, Santa Clara, CA (US)

(72) Inventors: Duane G. Quiet, Hillsboro, OR (US); Amit Kumar Srivastava, Penang (MY); Kenneth P. Foust, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 90 days.

(21) Appl. No.: 15/366,001

(22) Filed: Dec. 1, 2016

(65) Prior Publication Data

US 2018/0157286 A1    Jun. 7, 2018

(51) Int. Cl.
G06F 9/00 (2006.01)
G06F 1/08 (2006.01)
G06F 13/362 (2006.01)

(52) U.S. Cl.
CPC ............ *G06F 1/08* (2013.01); *G06F 13/362* (2013.01)

(58) Field of Classification Search
CPC .................................. G06F 1/08; G06F 13/362
USPC ............ 713/322; 370/359; 710/110; 331/179
See application file for complete search history.

(56) References Cited

U.S. PATENT DOCUMENTS

| | | | | |
|---|---|---|---|---|
| 7,050,478 B1* | 5/2006 | Weekly | ............... | G06F 1/08 327/101 |
| 8,446,903 B1* | 5/2013 | Ranganathan | ........ | H04L 49/109 370/359 |
| 9,165,638 B2* | 10/2015 | Giovannini | .......... | G11C 7/1078 |
| 2009/0284297 A1 | 12/2009 | Ebuchi | | |
| 2010/0045395 A1* | 2/2010 | Fu | .............. | G06F 1/08 331/179 |
| 2010/0169523 A1 | 7/2010 | Dunstan et al. | | |
| 2012/0066423 A1* | 3/2012 | Choo | ............ | G06F 13/4291 710/110 |
| 2012/0066430 A1 | 3/2012 | Cooper et al. | | |
| 2013/0304954 A1* | 11/2013 | Decesaris | ............. | G06F 13/38 710/110 |

(Continued)

FOREIGN PATENT DOCUMENTS

| | | |
|---|---|---|
| JP | 2009054087 | 3/2009 |
| JP | 2009259217 | 11/2009 |

OTHER PUBLICATIONS

U.S. Appl. No. 15/237,928, filed Aug. 16, 2016, entitled "Method, Apparatus and System for Role Transfer Functionality for a Bus Master," by Amit Kumar Srivastava.

(Continued)

*Primary Examiner* — Aurel Prifti
(74) *Attorney, Agent, or Firm* — Trop, Pruner & Hu, P.C.

(57) ABSTRACT

In one embodiment, an apparatus includes a clock control circuit to generate a clock signal for communication on an interconnect. The clock control circuit may be configured to receive an indication of a next device of a plurality of devices to be accessed and to dynamically update a control signal to cause the communication of the clock signal to be dynamically switched between a fixed clock frequency and a spread spectrum clock frequency based at least in part on the indication of communication to the next device. Other embodiments are described and claimed.

22 Claims, 7 Drawing Sheets

(56) References Cited

U.S. PATENT DOCUMENTS

| | | | |
|---|---|---|---|
| 2013/0335151 A1 | 12/2013 | Schrom et al. | |
| 2014/0016679 A1 | 1/2014 | Kesling et al. | |
| 2014/0095909 A1* | 4/2014 | Turullols | G06F 1/10 |
| | | | 713/322 |
| 2014/0269844 A1* | 9/2014 | Shimizu | H04B 1/7073 |
| | | | 375/146 |
| 2016/0048709 A1* | 2/2016 | Butler | H04L 67/1097 |
| | | | 340/10.51 |
| 2016/0124896 A1 | 5/2016 | Pitigoi-Aron et al. | |
| 2017/0199542 A1* | 7/2017 | Sylvester | G06F 1/08 |

OTHER PUBLICATIONS

U.S. Appl. No. 15/198,027, filed Jun. 30, 2016, entitled "Method, Apparatus and System for Dynamic Optimization of Signal Integrity on a Bus," by Duane G. Quiet.

International Searching Authority, "Notification of Transmittal of the International Search Report and the Written Opinion of the International Searching Authority," dated Mar. 23, 2018 in International application No. PCT/US2017/061463.

* cited by examiner

METHOD, APPARATUS AND SYSTEM FOR DYNAMIC CLOCK FREQUENCY CONTROL ON A BUS

TECHNICAL FIELD

Embodiments relate to optimization of interference mitigation for bus structures.

BACKGROUND

Many different types of known buses and other interfaces are used to connect different components using a wide variety of interconnection topologies. For example, on-chip buses are used to couple different on-chip components of a given integrated circuit (IC) such as a processor, system on a chip or so forth. External buses can be used to couple different components of a given computing system either by way of interconnect traces on a circuit board such as a motherboard, wires and so forth.

One recent interface technology is an I3C bus according to an I3C Specification, expected to become available from the Mobile Industry Processor Interface (MIPI) Alliance™ (www.mipi.org). This interface is expected to be used to serially connect devices, such as internal or external sensors or so forth, to a host processor, applications processor or standalone device via a host controller or input/output controller.

One issue that may occur as a result of clock signaling and other communications on this bus is electromagnetic interference as well as interference with components of the system. More specifically, electromagnetic interference (EMI) is caused by energy emitted as a result of signal communication. In turn, radio frequency interference (RFI) can be caused by energy of periodic signals such as clock signals that emit energy at a given clock frequency as well as multiple harmonics of this frequency, which may cause interference with one or more RF circuits, such as one or more radios of a platform. One solution to EMI is to use spread spectrum clocking (SSC) to cause a clock signal to be generated at a varying frequency within a small range around a center frequency. While this improves EMI, it may lead to an undesired increase in RFI, which causes potential detriment to radio performance. In many platforms, a system designer is faced with too many trade-offs and is unable to optimize EMI or RFI, at least without increasing system costs and component counts by adding costly cables/shielding.

DETAILED DESCRIPTION

Figure 1:
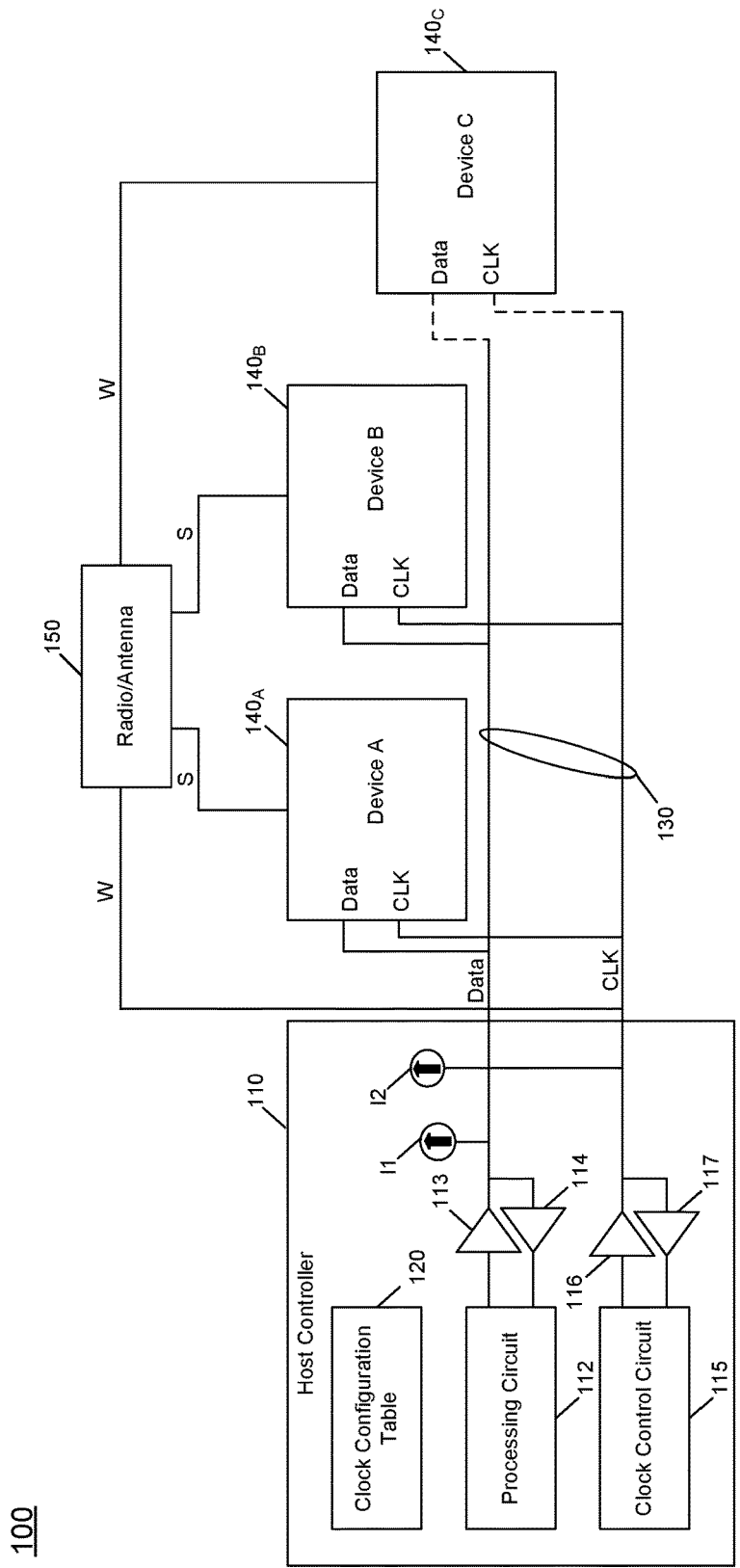
FIG. 1 is a block diagram of a system in accordance with an embodiment of the present invention.

In various embodiments, techniques are provided to mitigate the effects of both electromagnetic interference (EMI) and radio frequency interference (RFI) due to clock signaling along a bus structure such as a multi-drop bus. Although the scope of the present invention is not limited in this regard, example buses may include a multi-drop bus such as a bus in accordance with the forthcoming I3C specification.

To enable optimization techniques herein, a master such as a host controller, bus master, and/or main master, may provide dynamic control between spread spectrum clocking (SSC) and fixed frequency clocking of one or more clock signals. More specifically, this host controller may include or be provided with clock policy information regarding different devices coupled to the bus, such that dynamic clock control throughout operation can occur based at least in part on a clock policy of a given device with which the host controller is currently communicating. Understand that in many cases, this dynamic control may be on a per device basis as communication occurs with that device, while in other cases dynamic clock control may be realized based on clock policy of multiple devices to enable appropriate mitigation of EMI and/or RFI. Embodiments are applicable to internal buses and external buses such as an external connector.

SSC is a modulation technique in which a clock signal is output with a slightly varying frequency, by changing the period at which the clock signal is output, e.g., according to a predetermined set of different period values. This clock control reduces the maximum energy of a signal, but it comes at the expense of increasing the amount of energy over a wider bandwidth. Stated another way, SSC operation may improve EMI noise (by reducing signal amplitude), spreading the energy over a larger bandwidth, but can negatively affect RFI. Embodiments may be used to dynamically and flexibly control clock operation to be at either of fixed clock control and SSC control, and/or a combination of both. In this way, an "all or nothing" configuration can be avoided by dynamically controlling clocking operations as described herein.

Note that the EMI/RFI mitigation techniques described herein may be realized based at least in part on clock policy information determined during design activities for a platform including a bus as described herein. More specifically, design of the platform may include consideration of placement of devices on the bus (both with regard to a distance between a given device and host controller), as well as appropriate selection of devices to place in proximity to one another, given considerations of the type of devices. For example, certain devices that may benefit from SSC clocking may desirably be located during design to be a safe distance from RF circuits such as radios or so forth, so that the impact of SSC clocking of such devices minimizes RFI into RF circuits.

Further during design activities, a given clock policy can be established for each device and stored as part of configuration information to be used by the platform during operation. As different examples, this configuration information may be implemented within platform firmware, host controller firmware, or storage in another non-volatile storage that is accessible during platform operation.

In an embodiment a host controller (e.g., bus master) on a multi-drop bus may be configured to access this clock configuration information during operation in a dynamic manner, e.g., in response to receipt of an indication that a given device is ready to communicate with the host controller. The host controller may access such configuration information based at least in part thereon, and cause clock control circuitry of the host controller to generate a clock signal in accordance with a clock policy for the given device. In embodiments described herein, such control may be a selection of a fixed clock frequency or a spread spectrum clock frequency.

Furthermore as described herein additional platform elements may communicate with the host controller to cause the host controller to dynamically switch clock control operation as described herein. For example, one example platform is an Internet of Things (IoT) network in which multiple devices may be communicating via a bus, as well as wirelessly. As one example, consider an IoT appliance network such as a refrigerator or other appliance that includes multiple sensors to communicate with a sensor hub or other controller. These sensors may be coupled to the sensor controller by way of one or more multi-drop buses. In addition, at least some of the sensors may be wireless sensors that wirelessly transmit and/or receive information. Still further, the IoT appliance network may further include one or more other radio devices to enable radio communication, e.g., of status information, fault information or so forth wirelessly. To this end, a host processor of such IoT network may, upon a determination that a given radio device is about to communicate, indicate the same to the host controller to enable the host controller to dynamically control clocking with a fixed clock frequency to reduce RFI. Note that such operation may occur in this type of system even in instances where sensors or other devices that communicate via the bus are always connected and the radio devices may only be occasionally be connected. Of course in other situations, the host processor can send control information to the host controller to prevent any communication on the bus during such limited duration radio communications.

More typically, however, embodiments may be used in systems where both devices coupled to a bus as well as one or more radio devices (which may or not be coupled to the bus) may operate generally continuously, such that the control techniques herein can be used throughout all of a system's operation to enable dynamic clock control according to the clock control policies described herein.

Referring now to FIG. 1, shown is a block diagram of a system in accordance with an embodiment of the present invention. As shown in FIG. 1, a portion of a system 100 includes a host controller 110 coupled to a plurality of devices $140_A$-$140_C$ via a multi-drop bus 130. Devices 140 (also referred to herein as "slaves") may have different operational characteristics and also may have different capabilities of being added/removed from bus 130. Different combinations of connected/active devices 140 may affect susceptibility to EMI and/or RFI. As will be described herein, host controller 110 may be configured as a bus master, in at least certain operational phases. Note that bus 130 is implemented as a two-wire bus in which a single serial line forms a data interconnect and another single serial line forms a clock interconnect. As such, data and clock communications can occur, e.g., in bidirectional manner.

Host controller 110 may be configured to control data and clock signal integrity, as well as use (e.g.,) internal current sources to hold the bus when all devices are off. In some cases, host controller 110 may be a relatively simple host controller for a low complexity bus or other multi-drop bus, such as in accordance with an I²C or I3C Specification. Other multi-drop interfaces such as Serial Peripheral Interface and/or Microwire also may be present in particular embodiments.

At a high level, host controller 110 is configured to dynamically control clocking policy based on devices 140 connected to bus 130 and its environment. Host controller 140 is configured to use a SSC policy and dynamically drive clocking on bus 130 with or without SSC control according to clock policy depending on which device is being written to (or read from). Due to the broadband nature of SSC, sensitive radio devices (which may operate at narrowband frequencies) may be impacted by broadband noise caused by SSC, which may result in a degradation of signal-to-noise ratio (SNR) in such devices and thus limit sensitivity. As such, embodiments may dynamically control clocking operations to disable SSC in various situations. For example, where fixed clock frequency control is not causing an undesired EMI impact, a clock policy may disable SSC, e.g., prior to communicating with a device that is or is in close proximity to an RF circuit.

System policy may be defined during boot and controlled by host controller 110. Before any communication with devices 140, host controller may ensure a glitch-free clock signal is available. In an embodiment, SSC clocking may be enabled via one or more clock sources and a multiplexer to ensure glitch-free operation, so that here is no timing impact to communicating with devices 140, especially as host controller 110 is aware when to start communicating with a given device. In other cases, clock control switching may be realized via a digital implementation. In an embodiment, SSC clocking operations may be performed at a frequency less than or equal to a maximum frequency of a given communication protocol, so there is no system timing impact.

Note that host controller 110 generates the clock signal, and devices 140 may make use of the clock modulation from host controller 110, such that data transmitted from devices 140 may also be according to SSC. In an embodiment, parameters for SSC control may include: a modulation frequency (e.g., 32 kiloHertz (KHz)); a modulation profile (e.g., a triangle) and a spread percentage (e.g., −0.5%), although other parameters are of course possible.

At the high level illustrated in FIG. 1, assume that different types of devices 140 are present. Devices $140_{A-c}$ have different physical placements, electrical performance and different reasons to potentially make use of SSC. Specifically, device $140_A$ may be always powered on and present as being coupled to bus 130. As an example, device $140_A$ may be a given type of sensor, such as an accelerometer or other sensor which may be incorporated in a given system (such as a smartphone or other mobile platform). For purposes of discussion herein, assume that device $140_A$ operates as a slave to host controller 110. With regard to clock considerations, note that device $140_A$ is relatively close to host controller 110 and thus has short traces. Further assume that device $140_A$ operates with relatively low slew rates (e.g., slow edge rates). In an embodiment, a threshold level for considering whether a device has a slow edge rate may be approximately 1 volt per nanosecond (V/ns). In turn a threshold of approximately 2V/ns may be used to determine a fast edge rate device. Given the relative proximity of device $140_A$ and its relatively slow edge rate, in an embodiment a clock policy for this device may provide for a fixed clock frequency.

Second device $140_B$ may be powered when it is to be active. As an example, assume that device $140_B$ is another type of sensor, such as a camera device. In such example, device $140_B$ may be powered on only when a camera functionality of the system is active. With regard to clock considerations, note that device $140_B$ is relatively further away from host controller 110. Further assume that device $140_B$ operates with relatively high slew rates (e.g., fast edge rates). Still further with regard to device $140_B$, assume that this device is located in relatively close proximity to a sensitive RF circuit component, e.g., an RF antenna. Given the potential for RFI with this RF component, the clock policy for device $140_B$ also may be set for a fixed clock frequency despite its relatively fast edge rate, in an embodiment.

In turn, device $140_C$ may be powered when it is coupled to bus 130. In one case, device $140_C$ may be a slave device that can be physically added/removed via a hot plug or hot unplug operation. As examples device $140_C$ may be a cable, card, or external peripheral device that is coupled to bus 130, e.g., by a cable, external connection or so forth. In other cases, device $140_C$ may be coupled via an in-box cable. Here it may be the long distance that makes the potential for it to pick up in the box clock noise and radiate (causing higher EMI). Further with regard to third device $140_C$ assume that there are no sensitive RF circuits such as antennas or otherwise in close association with device $140_C$ or its routing to bus 130. As such, a clock policy for device $140_C$ may provide for a spread spectrum clock frequency for this device.

In the specific implementation of FIG. 1, note further the presence of one or more radio devices and/or antennas 150 (generically "radio devices"). As seen, given the location or proximity of such radio devices 150 to a clock line of bus 130 and respective distances to devices $140_A$-$140_C$, a given indication of the strength of coupling between these devices/ bus and radio devices can be considered in making the determination of a clock policy for the devices. As seen, a weakly coupled or long distance to a radio device adheres for bus 130 and third device $140_C$ (thus shown as a weak "W" coupling in FIG. 1) such that third device $140_C$ can be controlled with a spread spectrum clock policy. In turn, devices $140_A$, $140_B$ may be strongly coupled to radio device 150, given their proximity (thus shown as a strong "S" coupling in FIG. 1), and thus are controlled with a fixed frequency clock policy.

As illustrated in FIG. 1, host controller 110 includes a processing circuit 112. Understand that many different types of host controllers can be provided. As examples, host controller 110 may be an interface circuit of a multicore processor or other system on chip (SoC), application processor or so forth. In other cases, host controller 110 may be a standalone host controller for bus 130. And of course other implementations are possible. In different implementations, processing circuit 112 may represent one or more cores or other hardware processing logic of a particular device or it may simply be part of an interface circuit to act as transmitter and receiver for host controller 110. In turn, processing circuit 112 couples to a driver 113 that drives data onto bus 130 and a receiver 114 that receives incoming data via a data line of bus 130.

To this end, to enable data to be driven and received, a first current source $I_1$ couples to bus 130 at a trace of host controller 110. Current source $I_1$ may couple to a given supply voltage as an open drain connection. In an embodiment, current source $I_1$ may implemented as a controllable resistance (such as a parallel set of resistors) controllably selectable, e.g., via switches such as metal oxide semiconductor field effect transistors (MOSFETs). A given programmable resistance may thus couple between a voltage rail and, e.g., driver 113. In one embodiment driver 113 may be implemented to include a MOSFET having a gate driven by internal logic within host controller 110 to control the output voltage, a drain coupled to bus 130 and a source coupled to ground (details of this connection are not shown for ease of illustration in FIG. 1).

Host controller 110 further includes a clock control circuit 115 to provide a clock signal (and/or to receive a clock signal, in implementations for certain buses) to a clock line of bus 130 via corresponding driver 116 and receiver 117. In turn, another current source $I_2$ may be similarly configured to enable programmable control of parameters on the clock line of bus 130. In various embodiments, clock control circuit 115 may be configured to perform the dynamic clock control as described herein. For example clock control circuit 115 may access a clock configuration table 120, which in an embodiment is a non-volatile storage to store clock policies for multiple devices to couple to bus 130, as described herein. Clock control circuit 115 may receive information regarding a next device to be accessed, e.g., from processing circuit 112 and based at least in part on this information, determine clock control parameters. In an embodiment, based on determination of the received next device information, clock control circuit 115 may access one or more clock control policy entries in clock configuration table 120 to identify appropriate clock settings. In other cases, clock control circuit 115 may execute one or more algorithms to dynamically calculate optimized clock settings. In other cases, processing circuit 112 may instruct clock control circuit 115 to dynamically control clock operation to be a given one of a fixed clock frequency and a SSC frequency, based on information it has available to it, such as other system conditions, environmental conditions or so forth. Understand while shown at this high level in the embodiment of FIG. 1, many variations and alternatives are possible.

Figure 2:
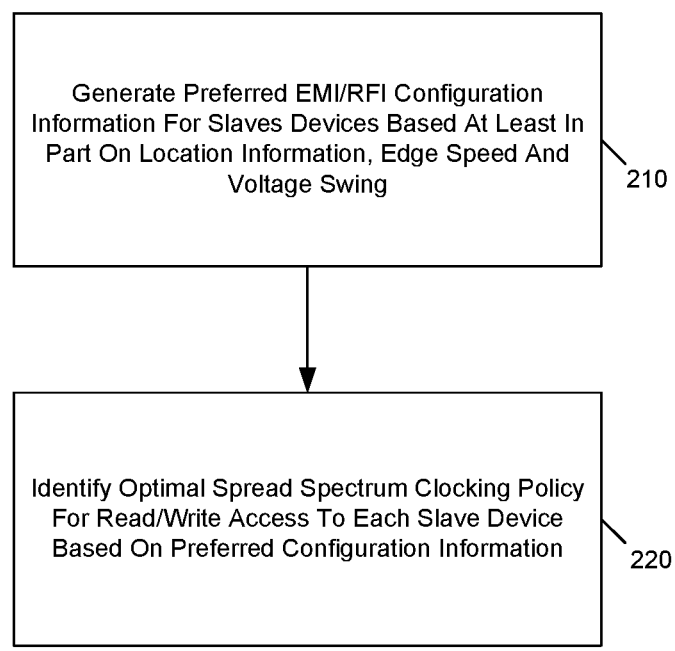
FIG. 2 is a flow diagram of a method in accordance with an embodiment of the present invention.

Referring now to FIG. 2, shown is a flow diagram of a method in accordance with an embodiment of the present invention. More specifically method 200 shown in FIG. 2 is a method for performing dynamic clock control of a clock signal communicated on a multi-drop bus in accordance with an embodiment. In various embodiments, method 200 may be performed by hardware circuitry, software and/or firmware (or combinations thereof) such as system design circuitry. Method 200 may be performed during platform design activities to enable creation of a spread spectrum clocking (SSC) policy for use in performing dynamic SSC control during actual platform operation. More specifically, in an embodiment method 200 may be performed during platform design activities to generate a SSC policy, which may be implemented as a table to store information regarding one or more slave devices coupled to a bus or other interconnect and optimum clock control parameters for such devices to maximize a tradeoff between EFI and RFI mitigation.

As illustrated, method 200 begins by generating preferred EMI/RFI configuration information for slave devices to be coupled to a bus or other interconnect (block 210). More specifically, this preferred EMI/RFI configuration information may be based at least in part on various information associated with the devices and their operational characteristics. For example, in an embodiment location information may be taken into account, where this location information may indicate a relative location of a slave device with respect to a host controller (e.g., a bus distance between these two devices). In addition, edge speed information, which relates to an edge rate of the device, and voltage swing information, also may be considered.

Note that at least some of this information may be based on information obtained from data sheets or other specification information regarding the device, or based at least in part on testing of the devices. And the location information may be based on platform design planning and a determination of where a given slave device is placed with respect to the host controller. In an embodiment, a system designer identifies EMI and RFI sensitivities of all devices to be coupled to a multi-drop bus and potential add-on cards/walk-up ports. The policy can be defined by analyzing bus traffic, or by analyzing actual radio performance within the system. From all of this information, preferred EMI/RFI configuration information for each device may be established. As an example, where a device is less susceptible to RFI, a preferred configuration may be for SSC. Instead, where RFI considerations prevail over EMI considerations, a fixed clock signal control may be selected.

Still with reference to FIG. 2, control next passes to block 220 where optimal spread spectrum clocking policy can be identified for accesses to each slave device based on this preferred configuration information. In an embodiment, the optimal SSC policy for a given device may be set to either an "SSC ON" policy to indicate clock control is to be with a variable SSC frequency when this device is to be accessed, or an "SSC OFF" policy to indicate a fixed frequency clock when the device is to be accessed. Note that in some embodiments a single optimal SSC policy per device may be provided, to be used both for read and write operations of the device. In other cases, it may be possible to provide different SSC policy for read and write with respect to a given device. This identification of optimal SSC policies for the different devices may be stored in a table so that it can be provided, e.g., as part of a platform's firmware (and/or firmware of the host controller). In other cases, these optimal SSC policies can be stored in other appropriate locations, such as in a storage associated with the host controller, or so forth. Note at this point when this optimal SSC policies are stored in a given platform storage, configuration activities are concluded and a platform is ready for regular operation in which dynamic clock control for a bus or other interconnect can be performed to dynamically control EFI/RFI mitigation.

In still other cases, this storage may be on an additional device/controller in the system that has a larger knowledge of this particular board in a larger system, i.e., there could be multiple boards, each with different SSC policies acting together. Depending on how one device/board operates, there may be different board (or device level) SSC profiles to be used. As one example, an automotive or server rack may include multiple boards with emissions that are intertwined.

In an embodiment, assume an automotive system that includes three different circuit boards each having a bus configured to perform dynamic clock control as described herein. One of these boards may include a main system controller that in turn can communicate certain clock control policy to the other boards (such as different media processing boards) that thus act as slave devices with regard to this host or master device. In such cases, the slave devices may be configured to default to a clock control policy provided by the host when such host clock control policy conflicts with a local clock control policy. Of course other arrangements are contemplated to accommodate multiple clock control policies that may be received from different sources.

Figure 3:
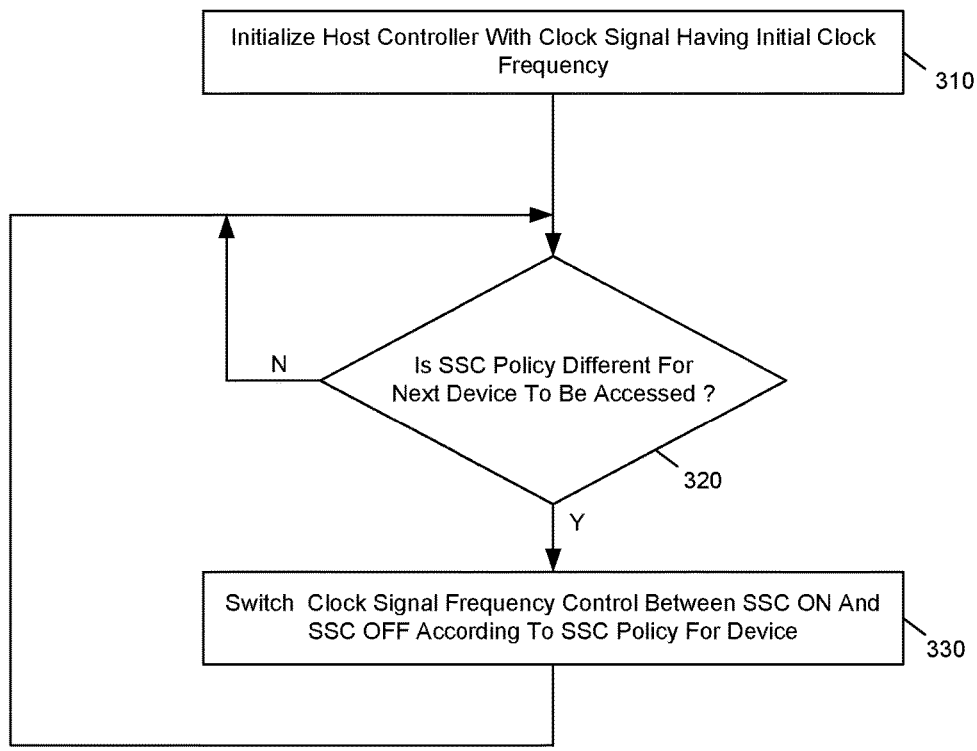
FIG. 3 is a flow diagram of a method in accordance with another embodiment of the present invention.

Referring now to FIG. 3, shown is a flow diagram of a method in accordance with another embodiment of the present invention. More specifically, method 300 shown in FIG. 3 is a method for dynamically controlling a clock control policy for a clock generator that generates a clock signal for a multi-drop bus or other interconnect. In embodiments herein, method 300 may be performed by appropriate combinations of hardware circuitry, software and/or firmware. In a particular embodiment, method 300 may be performed by clock generation circuitry of a host controller.

As illustrated, method 300 begins by initializing the host controller with a clock signal having an initial clock frequency (block 310). More specifically, this initial clock frequency may be set by the SSC policy. In some cases, this initial SSC policy may be a given SSC policy for an expected most active slave device. In other cases, the initial SSC policy may be a predetermined default policy, which in an embodiment may be an SSC ON policy, to ensure that EMI emissions stay within acceptable (e.g., tolerance and/or legal) limits.

At this point understand that the host controller and bus are active and normal system operations may occur. During such operations control passes to diamond 320 where it is determined as to whether the SSC policy for a slave device that is to be next accessed differs from the current SSC policy. If so, control passes to block 330 where the clock signal can be dynamically switched between a given one to the other of an SSC ON and an SSC OFF control state according to the SSC policy for this next-to-be accessed device.

Control then passes back to diamond 320 where method 300 may continue throughout system operation with iterative determinations made as to whether a next device is associated with an SSC policy that is the same or different than a currently active SSC policy. Understand while shown at this high level in the embodiment of FIG. 3, many variations and alternatives are possible. For example, in some cases understand that the switching may be performed at different times other than at interim periods between communications between host controller and one device and another device. For example, understand that in some cases control may dynamically switch during communications with a single device to enable a mix of SSC ON and SSC OFF operation with regard to that single device.

Embodiments thus provide techniques to dynamically optimize clock configuration by a host controller for a bus dynamically based on actual communicating devices. As such, embodiments provide a system designer flexibility for multi-drop buses to optimize clocking in a manner to mitigate both EMI and RFI dynamically. Still further, by providing this control, design constraints may be eased. For example, spacing between potentially interfering devices can be reduced. Still further, the need for expensive shielding and so forth can be avoided or reduced. Furthermore, less design constraints such as by minimization of keep-out areas and so forth can be realized. Embodiments may be particularly applicable to low power computing systems such as smartphones or other small mobile devices, to enable reduced size and reduced shielding costs, while reducing EMI and/or RFI as more slave devices dynamically communicate via a the multi-drop bus. Embodiments also may be implemented within a point-to-point bus to dynamically change between SSC and non-SSC clock control depending on the state of the rest of the system. For example, the system can configure sensitive radios to be OFF for certain communications to allow the switching of clocks for even a single slave.

Figure 4:
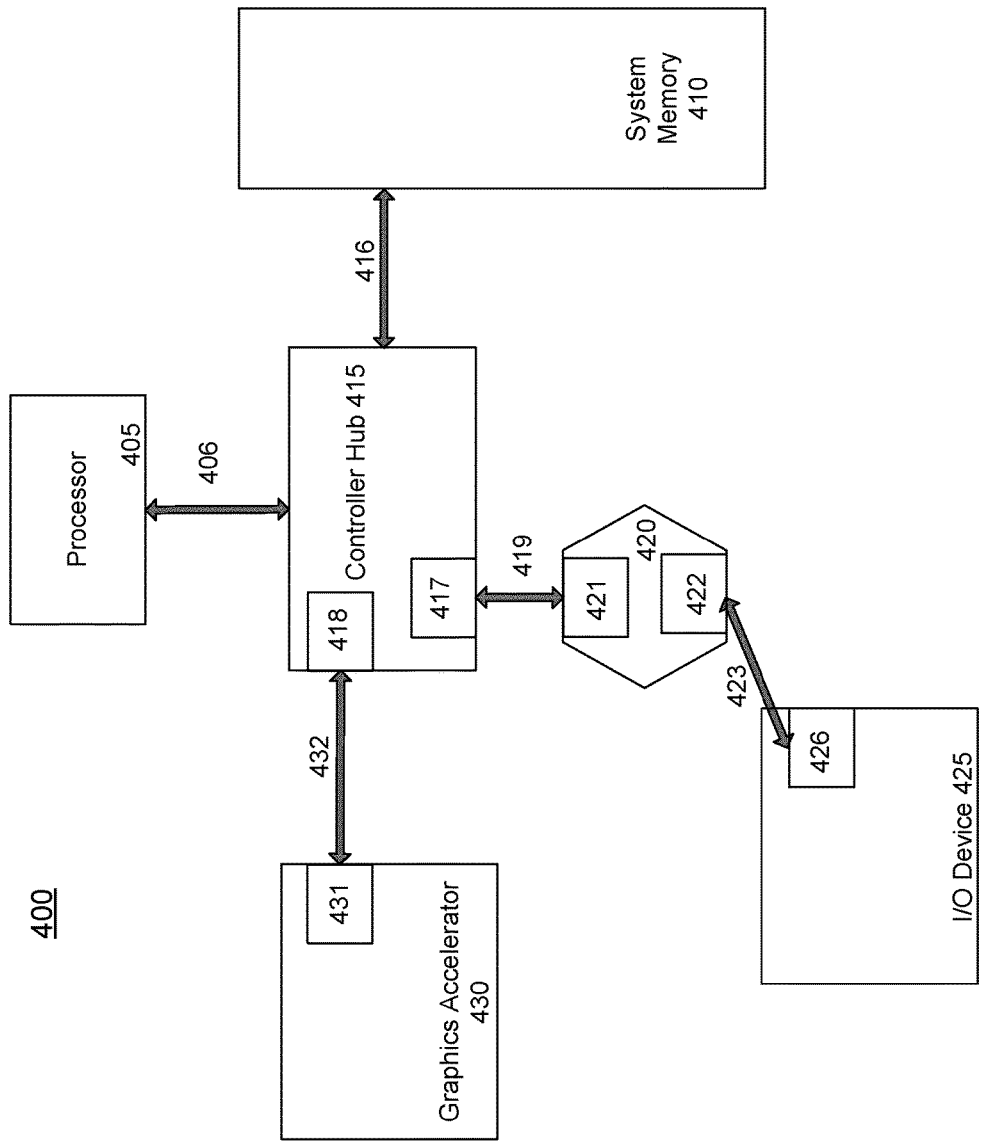
FIG. 4 is an embodiment of a fabric composed of point-to-point links that interconnect a set of components is illustrated.

Embodiments may be implemented in a wide variety of interconnect structures. Referring to FIG. 4, an embodiment of a fabric composed of point-to-point links that interconnect a set of components is illustrated. System 400 includes processor 405 and system memory 410 coupled to controller hub 415. Processor 405 includes any processing element, such as a microprocessor, a host processor, an embedded processor, a co-processor, or other processor. Processor 405 is coupled to controller hub 415 through front-side bus (FSB) 406. In one embodiment, FSB 406 is a serial point-to-point interconnect. In another embodiment, link 406 includes a parallel serial, differential interconnect architecture that is compliant with different interconnect standards, and which may couple with one or more host controllers to perform dynamic clocking control as described herein.

System memory 410 includes any memory device, such as random access memory (RAM), non-volatile (NV) memory, or other memory accessible by devices in system 400. System memory 410 is coupled to controller hub 415 through memory interface 416. Examples of a memory interface include a double-data rate (DDR) memory interface, a dual-channel DDR memory interface, and a dynamic RAM (DRAM) memory interface.

In one embodiment, controller hub 415 is a root hub, root complex, or root controller in a PCIe interconnection hierarchy. Examples of controller hub 415 include a chip set, a memory controller hub (MCH), a northbridge, an interconnect controller hub (ICH), a southbridge, and a root controller/hub. Often the term chip set refers to two physically separate controller hubs, i.e. a memory controller hub (MCH) coupled to an interconnect controller hub (ICH). Note that current systems often include the MCH integrated with processor 405, while controller 415 is to communicate with I/O devices, in a similar manner as described below. In some embodiments, peer-to-peer routing is optionally supported through root complex 415.

Here, controller hub 415 is coupled to switch/bridge 420 through serial link 419. Input/output modules 417 and 421, which may also be referred to as interfaces/ports 417 and 421, include/implement a layered protocol stack to provide communication between controller hub 415 and switch 420. In one embodiment, multiple devices are capable of being coupled to switch 420.

Switch/bridge 420 routes packets/messages from device 425 upstream, i.e., up a hierarchy towards a root complex, to controller hub 415 and downstream, i.e., down a hierarchy away from a root controller, from processor 405 or system memory 410 to device 425. Switch 420, in one embodiment, is referred to as a logical assembly of multiple virtual PCI-to-PCI bridge devices. Device 425 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices and which may be coupled via an I3C bus, as an example. Often in the PCIe vernacular, such a device is referred to as an endpoint. Although not specifically shown, device 425 may include a PCIe to PCI/PCI-X bridge to support legacy or other version PCI devices. Endpoint devices in PCIe are often classified as legacy, PCIe, or root complex integrated endpoints.

Graphics accelerator 430 is also coupled to controller hub 415 through serial link 432. In one embodiment, graphics accelerator 430 is coupled to an MCH, which is coupled to an ICH. Switch 420, and accordingly I/O device 425, is then coupled to the ICH. I/O modules 431 and 418 are also to implement a layered protocol stack to communicate between graphics accelerator 430 and controller hub 415. A graphics controller or the graphics accelerator 430 itself may be integrated in processor 405.

Figure 5:
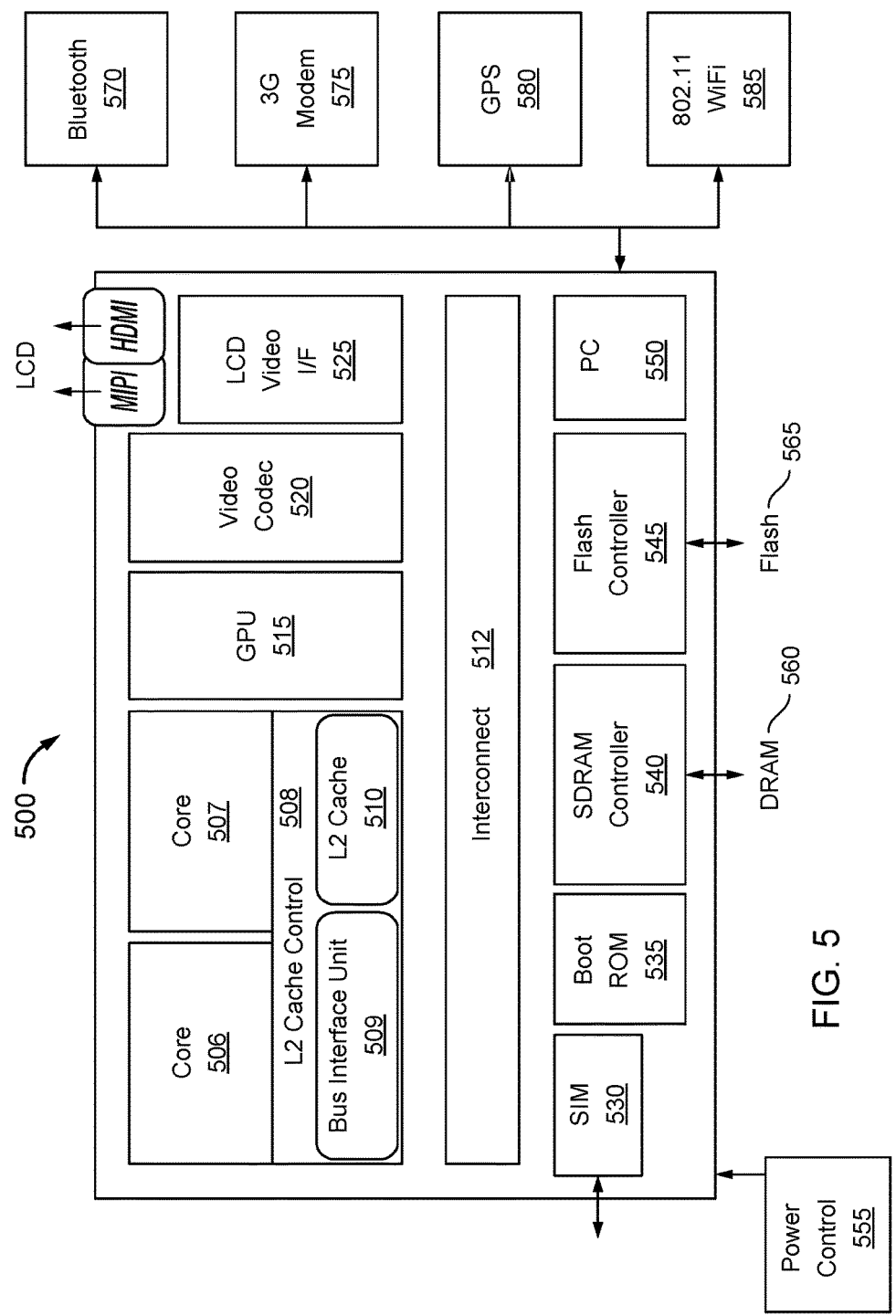
FIG. 5 is an embodiment of a SoC design in accordance with an embodiment is depicted.

Turning next to FIG. 5, an embodiment of a SoC design in accordance with an embodiment is depicted. As a specific illustrative example, SoC 500 may be configured for insertion in any type of computing device, ranging from portable device to server system. Here, SoC 500 includes 2 cores—506 and 507. Cores 506 and 507 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 506 and 507 are coupled to cache control 508 that is associated with bus interface unit 509 and L2 cache 510 to communicate with other parts of system 500 via an interconnect 512.

Interconnect 512 provides communication channels to the other components, such as a Subscriber Identity Module (SIM) 530 to interface with a SIM card, a boot ROM 535 to hold boot code for execution by cores 506 and 507 to initialize and boot SoC 500, a SDRAM controller 540 to interface with external memory (e.g., DRAM 560), a flash controller 545 to interface with non-volatile memory (e.g., flash 565), a peripheral controller 550 (e.g., an eSPI interface) to interface with peripherals, video codecs 520 and video interface 525 to display and receive input (e.g., touch enabled input), GPU 515 to perform graphics related computations, etc. Any of these interconnects/interfaces may incorporate aspects described herein, including dynamic clock control to reduce EMI and/or RFI, as described herein. In addition, the system illustrates peripherals for communication, such as a Bluetooth module 570, 3G modem 575, GPS 580, and WiFi 585. Also included in the system is a power controller 555.

Figure 6:
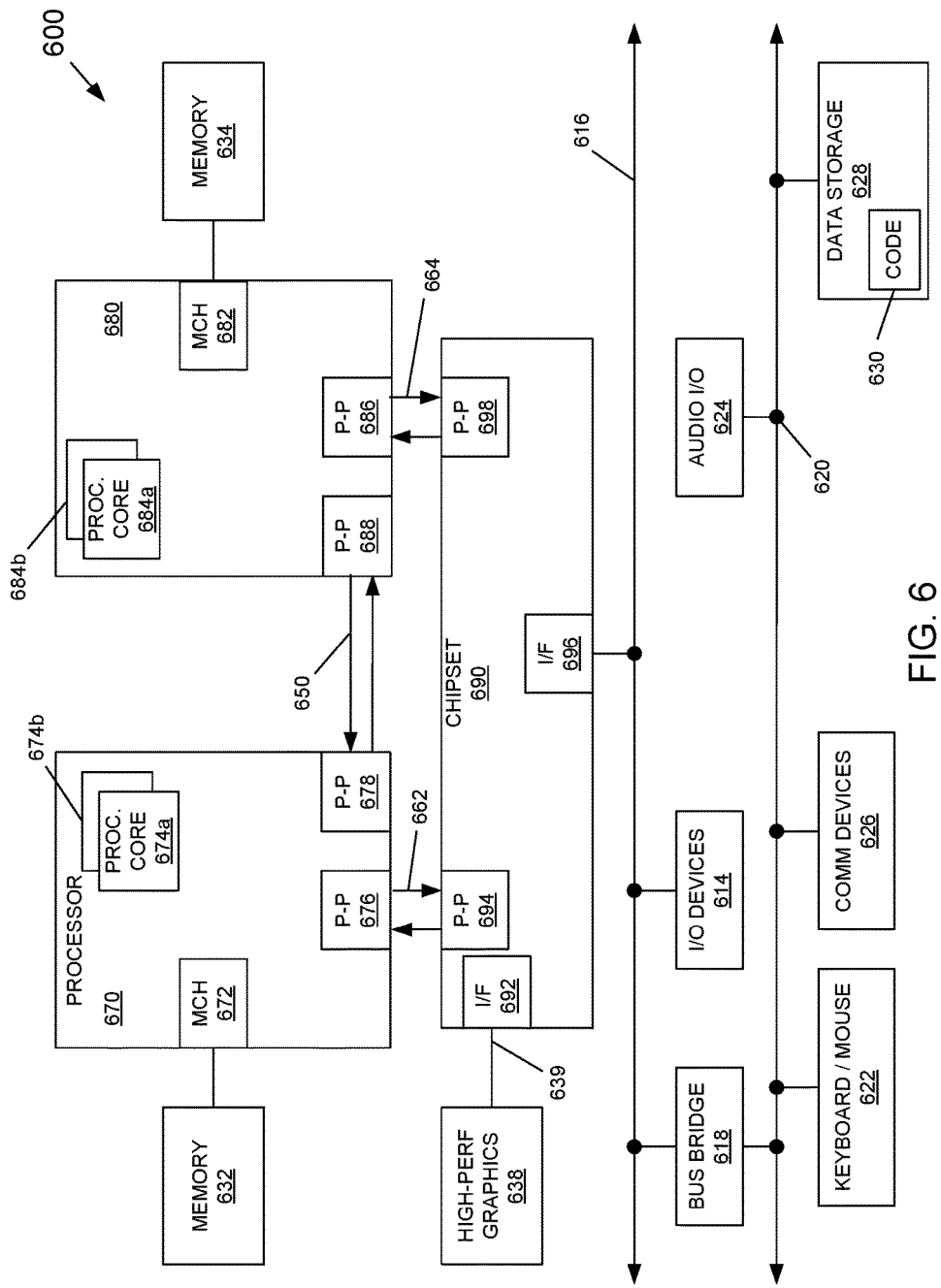
FIG. 6 is a block diagram of a system in accordance with an embodiment of the present invention.

Referring now to FIG. 6, shown is a block diagram of a system in accordance with an embodiment of the present invention. As shown in FIG. 6, multiprocessor system 600 includes a first processor 670 and a second processor 680 coupled via a point-to-point interconnect 650. As shown in FIG. 6, each of processors 670 and 680 may be many core processors including representative first and second processor cores (i.e., processor cores 674a and 674b and processor cores 684a and 684b).

Still referring to FIG. 6, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 6, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 664, respectively. As shown in FIG. 6, chipset 690 includes P-P interfaces 694 and 698.

Furthermore, chipset 690 includes an interface 692 to couple chipset 690 with a high performance graphics engine 638, by a P-P interconnect 639. As shown in FIG. 6, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Any of the devices shown in FIG. 6 may be configured to perform dynamic clock control for one or more of the interconnect structures, as described herein.

Figure 7:
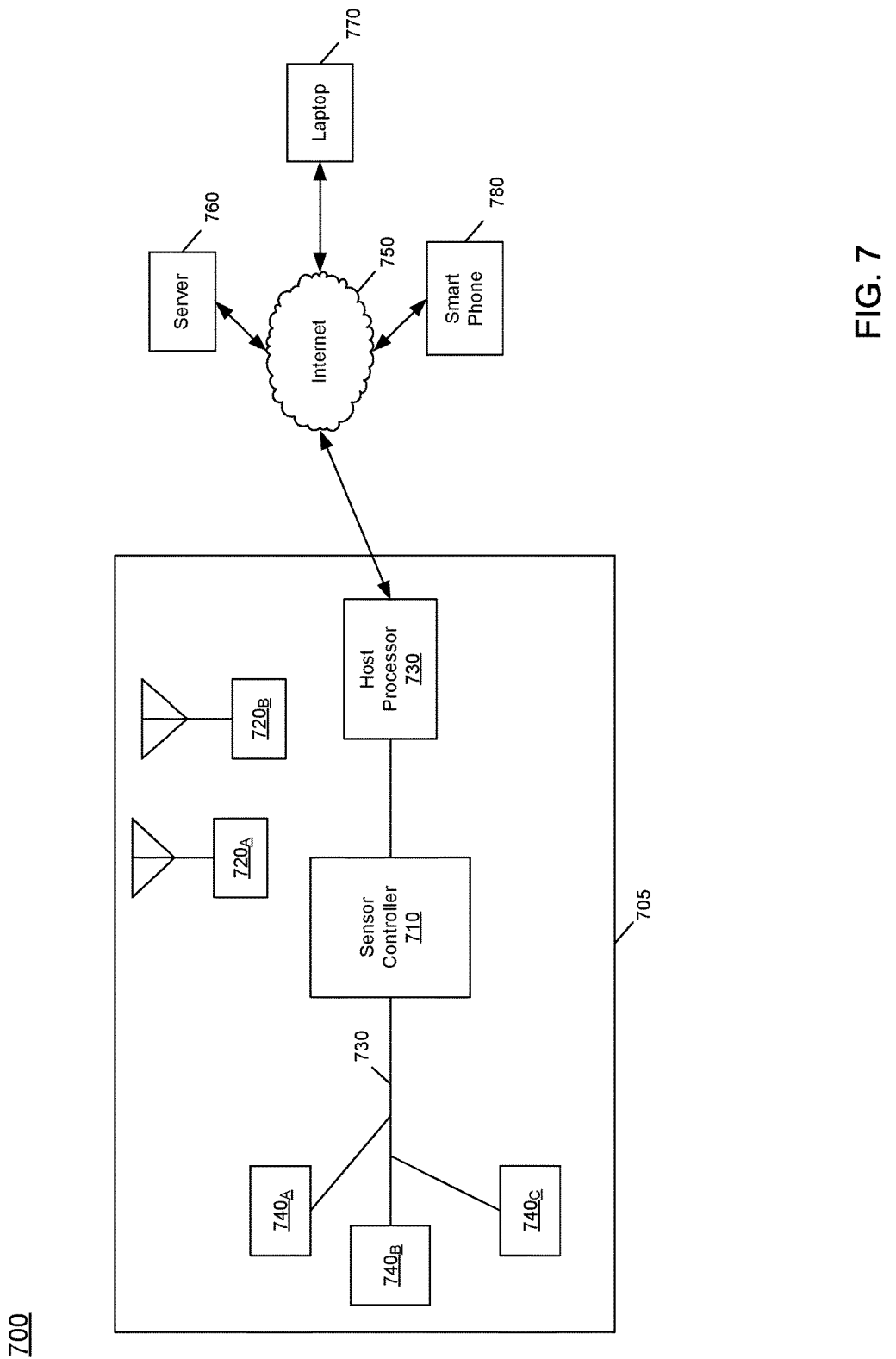
FIG. 7 is a block diagram of an IoT network in accordance with an embodiment of the present invention.

Referring now to FIG. 7, shown is a block diagram of an IoT network in accordance with an embodiment of the present invention. As shown in FIG. 7, IoT network 700 may be in the context of a smart appliance (generally illustrated at 705). As examples, smart appliance 705 may be a home appliance such as refrigerator, washing machine, dryer, security system, home automation system, among many other such examples. At the high level shown in FIG. 7, smart appliance 705 includes a host processor 730 which may be a master host processor such as a host central processing unit (CPU) that in turn couples to a sensor controller 710 such as a sensor hub. In some embodiments, sensor controller 710 may be implemented within a single integrated circuit with host processor 730.

In any event, sensor controller 710, which may include a host controller as described herein, is configured to communicate with various sensors $740_A$-$740_C$ via a bus 730. Assume bus 730 is an I3C or other multi-drop bus. Using embodiments described herein, sensor controller 710 may dynamically and flexibly control clock signaling on bus 730 based at least in part on clock control policies associated with active sensors 740. Still further, sensor controller 710 may receive control or status information from host processor 730 regarding wireless communications, e.g., by included wireless devices $720_A$ and $720_B$. Based on such information, sensor controller 710 may dynamically control clocking, e.g., according to a fixed clock frequency to reduce RFI when RF devices $720_A$, $720_B$ are actively communicating.

As further illustrated in FIG. 7, smart appliance 705 may communicate via a network 750 such as the Internet with one or more endpoints. For example, in the context of a home appliance or an enterprise appliance, communication of status and command information may occur via one or more of a server 760, a personal computer 770 such as a laptop and/or a smartphone 780. In a home context, laptop 770 and smartphone 780 may be an owner's devices that can be used to provide monitoring information to the owner and/or to communicate commands, via network 750 to smart appliance 705. And continuing with this example, server 760 may be configured to receive monitored alerts, where server 760 may be associated with a manufacturer or servicer of equipment within smart appliance 705. Understand while shown at this high level in the embodiment of FIG. 7, many variations and alternatives are possible.

The following Examples pertain to further embodiments.

In one example, an apparatus includes: a host controller to couple to an interconnect to which a plurality of devices may be coupled. The host controller may include: a first driver to drive first information onto the interconnect; a first receiver to receive second information from at least one of the plurality of devices via the interconnect; and a clock control circuit to generate a clock signal for communication on the interconnect. In turn, the clock control circuit may be configured to receive an indication of a next device of the plurality of devices to be accessed and to dynamically update a control signal to cause the communication of the clock signal to be dynamically switched between a fixed clock frequency and a spread spectrum clock frequency based at least in part on the indication of the next device.

In an example, the host controller is to communicate with the next device according to the clock signal having the fixed clock frequency based at least in part on a clock policy associated with the next device.

In an example, the clock control circuit is to access the clock policy associated with the next device and to update the control signal based thereon.

In an example, the clock policy is to indicate whether the host controller is to communicate the clock signal with the fixed clock frequency or the spread spectrum clock frequency during communication between the host controller and the next device.

In an example, the clock control circuit is to cause the communication of the clock signal to be dynamically switched when the host controller is in control of the interconnect.

In an example, the apparatus further comprises a storage to store a clock configuration table, the clock configuration table having a plurality of entries each to associate a device of the plurality of devices with a clock policy.

In an example, the host controller comprises a processing circuit to provide the next device indication to the clock control circuit in response to an indication that the next device has information to send to the host controller.

In an example, the clock control circuit is to receive a clock control command from the processing circuit and based thereon to dynamically update the control signal to cause the communication of the clock signal with a selected one of the fixed clock frequency and the spread spectrum clock frequency.

In an example, the clock control circuit is to communicate the clock signal with the fixed clock frequency when the host controller is to communicate with a first device of the plurality of devices, the first device having an edge rate less than a threshold rate.

In an example, the clock control circuit is to communicate the clock signal with the fixed clock frequency when the host controller is to communicate with a second device of the plurality of devices, the second device less than a threshold distance from a radio device.

In an example, the clock control circuit is to communicate the clock signal with the spread spectrum clock frequency when the host controller is to communicate with a third device of the plurality of devices, the third device coupled to the interconnect via a cable.

In an example, the clock control circuit comprises: a first clock source to output the clock signal with the fixed clock frequency; a second clock source to output the clock signal with the spread spectrum clock frequency; and a multiplexer to couple to the first clock source and the second clock source and output a selected one of the clock signal with the fixed clock frequency and the clock signal with the spread spectrum clock frequency.

In an example, the clock control circuit is to control the multiplexer to dynamically switch the output from the clock signal with the fixed clock frequency to the clock signal with the spread spectrum clock frequency, without a glitch.

In an example, the first driver is to embed the clock signal within the first information.

In another example, a method comprises: accessing, via a host controller, a first clock control policy to determine an initial clock control policy for generation of a clock signal to be communicated on a bus; generating the clock signal according to the initial clock control policy and outputting the clock signal on the bus according to the initial clock control policy;

identifying a next device of a plurality of devices coupled to the bus that the host controller is to access; accessing, via the host controller, a clock control policy for the next device;

and generating the clock signal according to the next device clock control policy and outputting the clock signal on the bus according to the next device clock control policy, to enable the host controller to communicate with the next device, where at least one of the initial clock control policy and the next device clock control policy comprises a spread spectrum clock policy.

In an example, the method further comprises accessing a storage having a configuration table to obtain the initial clock control policy and the next device clock control policy.

In an example, the method further comprises switching the output of the clock signal to be according to the next device clock control policy when the host controller has master control of the bus.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises: a first device coupled to a host controller via a bus, where the first device is a first distance from the host controller and associated with a first clock control policy; a second device coupled to the host controller via the bus and associated with a second clock control policy, where the second device is a second distance from the host controller, the second distance greater than the first distance; and the host controller having a clock control circuit to identity that the second device has information to send to the host controller via the bus, and dynamically control a clock signal based on the second clock control policy in response to the identification of the second device.

In an example, the system further comprises a non-volatile storage to store a clock policy table having a first entry associated with the first device to store the first clock control policy and a second entry associated with the second device to store the second clock control policy.

In an example, the clock control circuit is to access the second entry to obtain the second clock control policy in response to the identification of the second device, and to control a selection circuit, coupled to a first clock source to provide the clock signal with a fixed clock frequency and coupled to a second clock source to provide the clock signal with a spread spectrum clock frequency, to output a selected one of the clock signal with the fixed clock frequency and the clock signal with the spread spectrum clock frequency.

In an example, the system comprises an IoT network including at least one radio device, where responsive to an indication of radio communication by the radio device, the host controller is to control the clock signal according to a fixed frequency clock control policy.

In an example, the system comprises a first circuit board on which the host controller and at least one of the first device and the second device are adapted, and further comprising a second circuit board including a master controller to send a master clock control policy to the host controller, where the host controller is to dynamically control the clock signal based on the master clock control policy, for at least a first duration.

In another example, an apparatus comprises: host controller means for coupling to an interconnect to which a plurality of devices may be coupled. The host controller means may include: first driver means for driving first information onto the interconnect; first receiver means for receiving second information from at least one of the plurality of devices via the interconnect; and clock control means for generating a clock signal for communication on the interconnect, the clock control means to receive an indication of a next device of the plurality of devices to be accessed and to dynamically update a control signal to cause the communication of the clock signal to be dynamically switched between a fixed clock frequency and a spread spectrum clock frequency based at least in part on the indication of the next device.

In an example, the host controller means is to communicate with the next device according to the clock signal having the fixed clock frequency based at least in part on a clock policy associated with the next device, and to access the clock policy associated with the next device and to update the control signal based thereon.

In an example, the clock policy is to indicate whether the host controller means is to communicate the clock signal with the fixed clock frequency or the spread spectrum clock frequency during communication between the host controller means and the next device.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus to control communication on an interconnect comprising:
    a host controller to couple to the interconnect to which a plurality of devices may be coupled, the host controller including:
        a first driver to drive first information onto the interconnect;
        a first receiver to receive second information from at least one of the plurality of devices via the interconnect; and
        a clock control circuit to generate a clock signal for communication on the interconnect, the clock control circuit to receive an indication of a next device of the plurality of devices to be accessed and to dynamically update a control signal to cause the communication of the clock signal to be dynamically switched between a fixed clock frequency and a spread spectrum clock frequency based at least in part on the indication of the next device.

2. The apparatus of claim 1, wherein the host controller is to communicate with the next device according to the clock signal having the fixed clock frequency based at least in part on a clock policy associated with the next device.

3. The apparatus of claim 2, wherein the clock control circuit is to access the clock policy associated with the next device and to update the control signal based thereon.

4. The apparatus of claim 3, wherein the clock policy is to indicate whether the host controller is to communicate the clock signal with the fixed clock frequency or the spread spectrum clock frequency during communication between the host controller and the next device.

5. The apparatus of claim 1, wherein the clock control circuit is to cause the communication of the clock signal to be dynamically switched when the host controller is in control of the interconnect.

6. The apparatus of claim 1, further comprising a storage to store a clock configuration table, the clock configuration table having a plurality of entries each to associate a device of the plurality of devices with a clock policy.

7. The apparatus of claim 1, wherein the host controller comprises a processing circuit, the processing circuit to provide the next device indication to the clock control circuit in response to an indication that the next device has information to send to the host controller.

8. The apparatus of claim 7, wherein the clock control circuit is to receive a clock control command from the processing circuit and based thereon to dynamically update the control signal to cause the communication of the clock signal with a selected one of the fixed clock frequency and the spread spectrum clock frequency.

9. The apparatus of claim 1, wherein the clock control circuit is to communicate the clock signal with the fixed clock frequency when the host controller is to communicate with a first device of the plurality of devices, the first device having an edge rate less than a threshold rate.

10. The apparatus of claim 1, wherein the clock control circuit is to communicate the clock signal with the fixed clock frequency when the host controller is to communicate with a second device of the plurality of devices, the second device less than a threshold distance from a radio device.

11. The apparatus of claim 1, wherein the clock control circuit is to communicate the clock signal with the spread spectrum clock frequency when the host controller is to communicate with a third device of the plurality of devices, the third device coupled to the interconnect via a cable.

12. The apparatus of claim 1, wherein the clock control circuit comprises:
    a first clock source to output the clock signal with the fixed clock frequency;
    a second clock source to output the clock signal with the spread spectrum clock frequency; and
    a multiplexer to couple to the first clock source and the second clock source and output a selected one of the clock signal with the fixed clock frequency and the clock signal with the spread spectrum clock frequency.

13. The apparatus of claim 12, wherein the clock control circuit is to control the multiplexer to dynamically switch the output from the clock signal with the fixed clock frequency to the clock signal with the spread spectrum clock frequency, without a glitch.

14. The apparatus of claim 1, wherein the first driver is to embed the clock signal within the first information.

15. At least one non-transitory computer readable storage medium comprising instructions that when executed enable a system to:
    access, via a host controller, a first clock control policy to determine an initial clock control policy for generation of a clock signal to be communicated on a bus;
    generate the clock signal according to the initial clock control policy and output the clock signal on the bus according to the initial clock control policy;
    identify a next device of a plurality of devices coupled to the bus that the host controller is to access;
    access, via the host controller, a clock control policy for the next device; and
    generate the clock signal according to the next device clock control policy and output the clock signal on the bus according to the next device clock control policy, to enable the host controller to communicate with the next device, wherein at least one of the initial clock control policy and the next device clock control policy comprises a spread spectrum clock policy.

16. The at least one non-transitory computer readable storage medium of claim 15, further comprising instructions that when executed enable the system to access a storage having a configuration table to obtain the initial clock control policy and the next device clock control policy.

17. The at least one non-transitory computer readable storage medium of claim 15, further comprising instructions that when executed enable the system to switch the output of the clock signal to be according to the next device clock control policy when the host controller has master control of the bus.

18. A system for communicating on a bus comprising:
    a first device coupled to a host controller via the bus, wherein the first device is a first distance from the host controller and associated with a first clock control policy;
    a second device coupled to the host controller via the bus and associated with a second clock control policy, wherein the second device is a second distance from the host controller, the second distance greater than the first distance; and
    the host controller having a clock control circuit to identify that the second device has information to send to the host controller via the bus, and dynamically control a clock signal based on the second clock control policy in response to the identification of the second device.

19. The system of claim 18, further comprising a non-volatile storage to store a clock policy table having a first entry associated with the first device to store the first clock control policy and a second entry associated with the second device to store the second clock control policy.

20. The system of claim 19, wherein the clock control circuit is to access the second entry to obtain the second clock control policy in response to the identification of the second device, and to control a selection circuit, coupled to a first clock source to provide the clock signal with a fixed clock frequency and coupled to a second clock source to provide the clock signal with a spread spectrum clock frequency, to output a selected one of the clock signal with the fixed clock frequency and the clock signal with the spread spectrum clock frequency.

21. The system of claim 18, wherein the system comprises an Internet of Things (IoT) network including at least one radio device, wherein responsive to an indication of radio communication by the radio device, the host controller is to control the clock signal according to a fixed frequency clock control policy.

22. The system of claim 18, wherein the system comprises a first circuit board on which the host controller and at least one of the first device and the second device are adapted, and further comprising a second circuit board including a master controller to send a master clock control policy to the host controller, wherein the host controller is to dynamically control the clock signal based on the master clock control policy, for at least a first duration.

* * * * *